(12) United States Patent
    Wakao

(10) Patent No.: US 10,518,635 B2
(45) Date of Patent: Dec. 31, 2019

(54) FUEL SUPPLY PORTION STRUCTURE OF FUEL SUPPLY PIPE

(71) Applicant: HONDA MOTOR CO., LTD., Tokyo (JP)

(72) Inventor: Masaki Wakao, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 15/837,591

(22) Filed: Dec. 11, 2017

(65) Prior Publication Data

US 2018/0170174 A1 Jun. 21, 2018

(30) Foreign Application Priority Data

Dec. 15, 2016 (JP) ................................. 2016-243374

(51) Int. Cl.
    *B60K 15/04* (2006.01)
    *B67D 7/04* (2010.01)
    *B67D 7/32* (2010.01)
    *B67D 7/46* (2010.01)

(52) U.S. Cl.
    CPC ............ *B60K 15/04* (2013.01); *B67D 7/0476* (2013.01); *B67D 7/3209* (2013.01); *B60K 2015/0461* (2013.01); *B67D 7/46* (2013.01)

(58) Field of Classification Search
    CPC ........... B60K 2015/03528; B60K 2015/03538; B60K 2015/03552; B60K 15/04; B60K 15/035
    USPC .......................................... 141/350; 220/86.2
    See application file for complete search history.

(56) References Cited

U.S. PATENT DOCUMENTS

| | | | | |
|---|---|---|---|---|
| 4,715,509 A | * | 12/1987 | Ito | B60K 15/04 141/59 |
| 4,941,587 A | * | 7/1990 | Terada | B60K 15/04 220/746 |
| 5,186,220 A | * | 2/1993 | Scharrer | B60K 15/03519 137/39 |
| 5,921,424 A | * | 7/1999 | Palvolgyi | B60K 15/04 141/301 |
| 5,960,839 A | * | 10/1999 | Armesto | B60K 15/04 141/301 |
| 6,105,612 A | * | 8/2000 | Schaar | B60K 15/035 123/519 |

(Continued)

FOREIGN PATENT DOCUMENTS

JP 2016-113101 A 6/2016

*Primary Examiner* — Timothy L Maust
(74) *Attorney, Agent, or Firm* — Rankin, Hill & Clark LLP

(57) ABSTRACT

To prevent fuel from leaking to outside even when the fuel flows back at the time of an automatic stop operation during refueling. A fuel supply portion structure of a fuel supply pipe, including a tubular portion having a filler port and a connection port, a first flap mechanism which is provided on the filler port side of the tubular portion, a drain hole, and a drain hole on-off valve, wherein the drain hole on-off valve is disposed on a placement surface located at the lowermost side of a vehicle on an inner wall of a first inner diameter member, the placement surface is made of an inclined surface falling from the filler port side toward the connection port with respect to a horizontal plane of the vehicle, and a wall portion rising toward the filler port is provided on the filler port side of the inclined surface.

4 Claims, 5 Drawing Sheets

(56) References Cited

U.S. PATENT DOCUMENTS

| | | | | |
|---|---|---|---|---|
| 7,926,522 | B2* | 4/2011 | Aitken | B60K 15/04 |
| | | | | 141/301 |
| 8,087,434 | B2* | 1/2012 | Stephan | B60K 15/0406 |
| | | | | 141/301 |
| 10,065,496 | B2* | 9/2018 | Frank | B60K 15/04 |
| 2002/0189691 | A1* | 12/2002 | Morinaga | B60K 15/03519 |
| | | | | 137/588 |
| 2014/0319161 | A1* | 10/2014 | Kito | B60K 15/04 |
| | | | | 220/820 |
| 2017/0361704 | A1* | 12/2017 | Miura | B60K 15/04 |

* cited by examiner

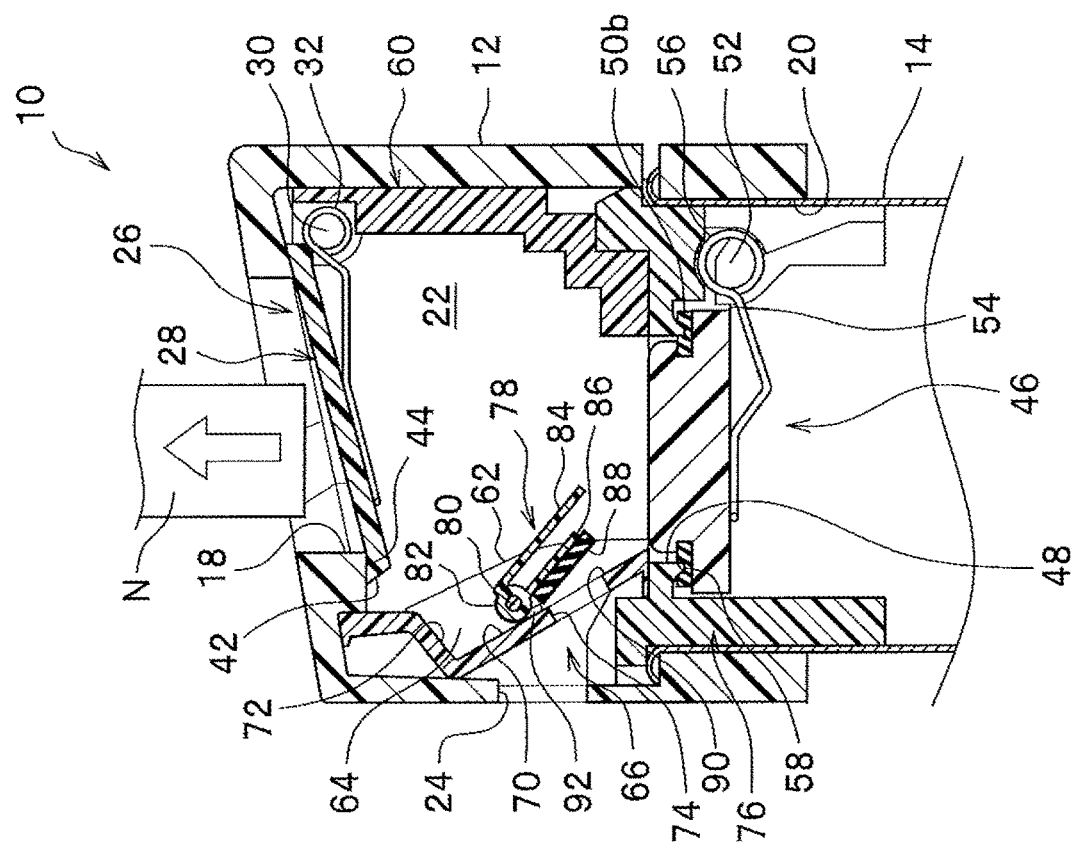
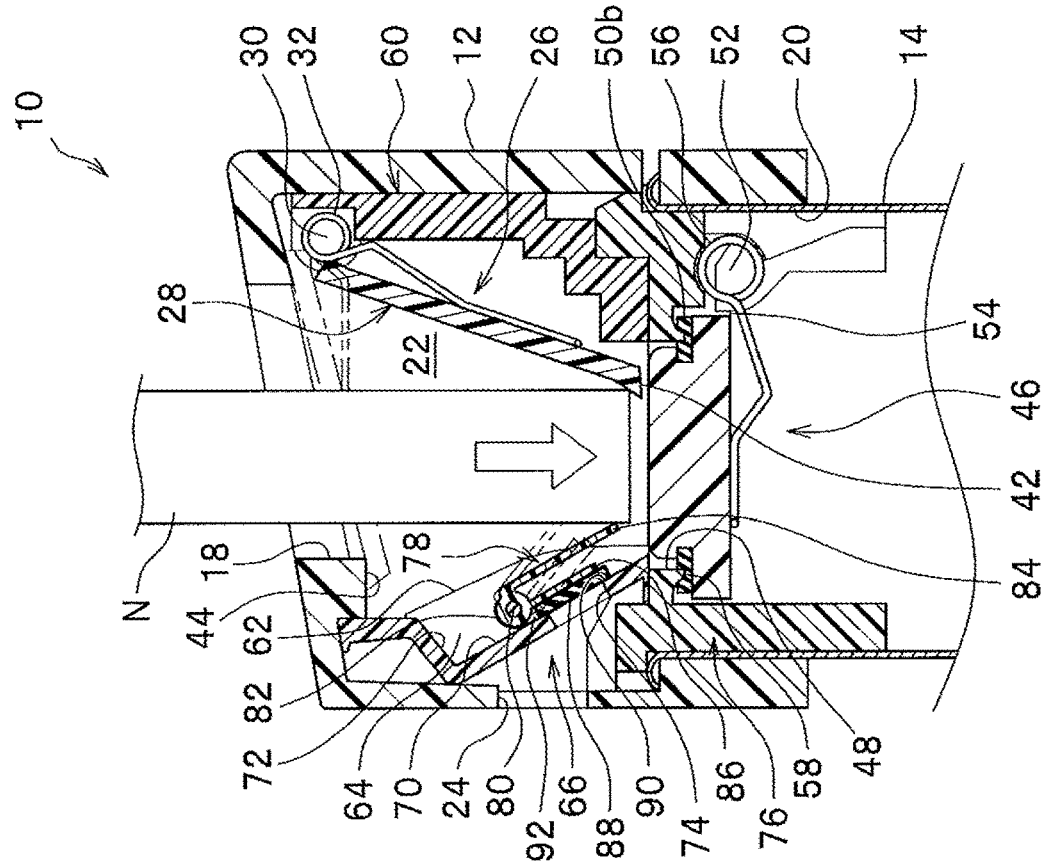

FUEL SUPPLY PORTION STRUCTURE OF FUEL SUPPLY PIPE

CROSS REFERENCE TO RELATED APPLICATIONS

This application claims the foreign priority benefit under Title 35, United States Code, § 119 (a)-(d) of Japanese Patent Application No. 2016-243374, filed on Dec. 15, 2016, the disclosure of which is herein incorporated by reference in its entirety.

TECHNICAL FIELD

The present invention relates to a fuel supply portion structure of a fuel supply pipe for communicatively connecting a filler port and a fuel tank.

BACKGROUND ART

A vehicle such as an automobile including an internal combustion engine is provided with a fuel supply pipe for communicatively connects the filler port into which a nozzle of a refueling gun is inserted and the fuel tank in which fuel is stored. In recent years, in order to improve convenience during refueling fuel, a so-called capless type fuel supply portion structure without a fuel cap conventionally provided on the filler port has been adopted.

For example, Patent Document 1 discloses the capless type fuel supply portion structure, and the fuel supply portion has a substantially cylindrical shape and includes a shield attached to a shield attachment port of an outer panel of a vehicle body. A drain hole (water drain hole) for discharging water, dust and the like entering an inner space of the shield to outside is formed at the lowermost side (lowest position) of the vehicle in the shield.

CITATION LIST

Patent Literature

Patent Document 1: Japanese Patent Application Publication No. 2016-113101

SUMMARY OF INVENTION

Technical Problem

When the capless type fuel supply portion structure is adopted, a vertical height between a mouth of the filler port and an automatic stop sensor attached to a tip of the nozzle of the refueling gun is smaller than that of the conventional cap type fuel supply portion structure.

Therefore, when the capless type fuel supply portion structure is adopted, there is a possibility that the fuel flows back at the time of an automatic stop operation during refueling and flows over an inner cap, to enter a space between the inner cap and the outer cap. Further, there is a possibility that fuel entering the space between the inner cap and the outer cap is discharged to the outside from the drain hole.

The present invention has been made in view of the above problems, and an object of the present invention is to provide a fuel supply portion structure of the fuel supply pipe, capable of preventing the fuel from leaking to the outside even when the fuel flows back at the time of the automatic stop operation during refueling.

Solution to Problem

In order to achieve the above object, an aspect of the present invention is a fuel supply portion structure of a fuel supply pipe, including a tubular portion having an opening into which a nozzle of a refueling gun is inserted and a connection port to which the fuel supply pipe for supplying fuel to a fuel tank is connected, a flap mechanism which is provided on the opening side of the tubular portion and is pressed by the nozzle to open the opening when the nozzle is inserted through the opening, a drain hole formed in the tubular portion and communicating inside and outside of the tubular portion, an inner diameter member attached to an inner wall of the tubular portion, and a drain hole on-off valve for opening and closing the drain hole, wherein the drain hole on-off valve is disposed on a placement surface located at the lowermost side of a vehicle on an inner wall of the inner diameter member, the placement surface is made of an inclined surface falling from the opening side toward the connection port with respect to a horizontal plane of the vehicle, and a wall portion rising toward the opening is provided on the opening side of the inclined surface. In the present invention, the "horizontal plane of the vehicle" means a plane perpendicular to a vertical direction of the vehicle.

Advantageous Effects of Invention

According to the present invention, it is possible to obtain the fuel supply portion structure of the fuel supply pipe, capable of preventing the fuel from leaking to the outside even when the fuel flows back at the time of the automatic stop operation during refueling.

BRIEF DESCRIPTION OF DRAWINGS

FIGS. 2A and 2B are partially omitted enlarged cross-sectional views for describing an operation of an opening and closing mechanism shown in FIG. 1;

DESCRIPTION OF EMBODIMENTS

Figure 1:
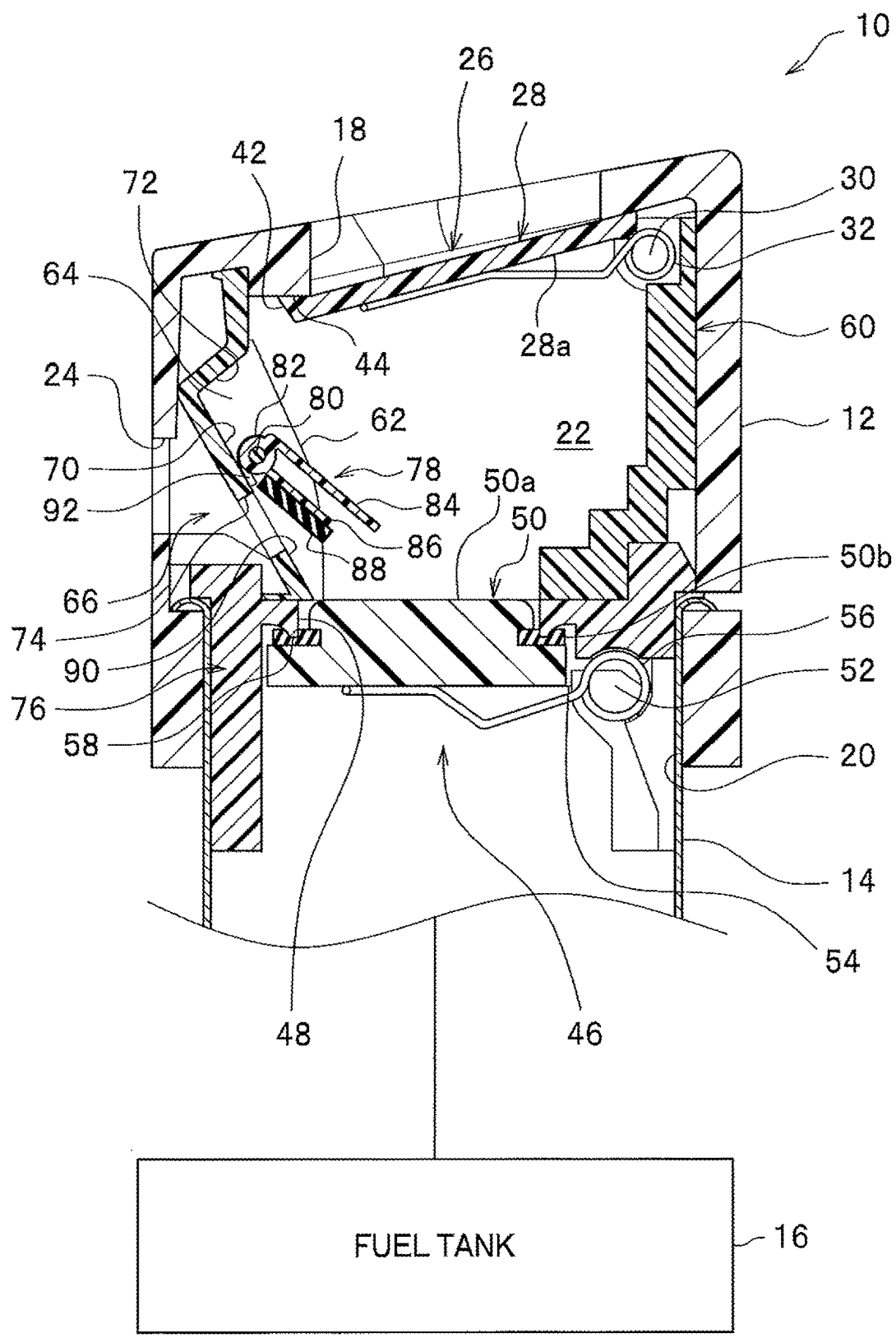
FIG. 1 is a partially omitted enlarged cross-sectional view showing a fuel supply portion structure according to an embodiment of the present invention.

Next, an embodiment of the present invention will be described in detail with reference to the drawings. FIG. 1 is a partially omitted enlarged cross-sectional view showing a fuel supply portion structure according to the embodiment of the present invention.

A fuel supply portion (not shown) is provided at a predetermined portion of a vehicle. The fuel supply portion includes a substantially disc-shaped lid portion (not shown) and a hinge portion (not shown) for rotating the lid portion so as to freely open and close. The lid portion maintains a closed state of the lid portion by a lock mechanism and is brought into an unlocked state by operation of a release lever provided in a vehicle compartment, so that the lid portion is rotated by a predetermined angle about the hinge portion, to be switched to an open state from the closed state.

As shown in FIG. 1, a fuel supply portion structure 10 according to the embodiment of the present invention includes a tubular portion (tube portion) 12 and a filler pipe (fuel supply pipe) 14, which are applied to a fuel supply portion (not shown). The tubular portion 12 has a cylindrical shape, and includes a filler port (opening) 18 into which a nozzle N (see FIGS. 2A, 2B) of a refueling gun (not shown) is inserted and a connection port 20 to which a filler pipe 14 for supplying fuel to a fuel tank 16 is connected. The filler pipe 14 feeds the fuel supplied from the tubular portion 12 to the fuel tank 16.

Between the filler port 18 and the connection port 20 in an axial direction of the tubular portion 12, there is provided an inner space 22 for communicating the filler port 18 and the connection port 20. A drain hole 24 for communicating the inner space 22 with outside is formed in a middle of the tubular portion 12. The drain hole 24 is formed with a through-hole. The drain hole 24 is for discharging water, dust and the like entering the inner space 22 of the tubular portion 12 to the outside.

A first flap mechanism (flap mechanism) 26 is disposed on the filler port 18 side of the tubular portion 12. The first flap mechanism 26 opens and closes the filler port 18 during refueling. For example, as will be described below, when the nozzle N of the refueling gun (not shown) is inserted through the filler port 18, the first flap mechanism 26 is pressed by a tip of the nozzle N to open the filler port 18.

The first flap mechanism 26 includes a first shutter member 28 for opening and closing the filler port 18 of the tubular portion 12, a first hinge portion 30 which is a rotating shaft of the first shutter member 28, and a first spring member 32 which is engaged with the first hinge portion 30 and urges the first shutter member 28 to the closed state. An engaging portion 42 to be engaged with a lower portion of the filler port 18 is provided at a tip in an axial direction of the first shutter member 28.

The first shutter member 28 has a shutter body 28a curved in a substantially arc shape and is provided rotatable about the first hinge portion 30 disposed on one side of the shutter body 28a. The first shutter member 28 rotates to switch between the closed state in which the engagement portion 42 is in contact with a first seat portion 44 provided in the lower portion of the filler port 18 to close the filler port 18 and the open state in which the engagement portion 42 is separated from the first seat portion 44 to open the filler port 18.

A second flap mechanism (another flap mechanism) 46 is disposed on the connection port 20 side of the tubular portion 12. The second flap mechanism 46 opens and closes a "connection port side opening" 48 during refueling. For example, as will be described below, when the nozzle N (see FIG. 2A and the like) of the refueling gun (not shown) is inserted through the filler port 18, the second flap mechanism 46 is pressed by the tip of the nozzle N to open the connection port side opening 48 (see FIG. 3B). Since the second flap mechanism 46 is disposed on the connection port 20 side of the tubular portion 12, it is possible to reliably prevent dust and the like from entering the filler pipe 14 and the fuel tank 16.

The second flap mechanism 46 includes a second shutter member 50 for opening and closing the connection port side opening 48, a second hinge portion 52 which is a rotating shaft of the second shutter member 50, an arm portion 54 for connecting the second shutter member 50 and the second hinge portion 52, and a second spring member 56 which is engaged with the second hinge portion 52 and urges the second shutter member 50 to the closed state.

The second shutter member 50 includes a shutter body 50a having an annular step portion formed therein and a seal ring 50b. The seal ring 50 b is formed of, for example, an elastic material such as rubber, and is brought into contact with a second seat portion 58 provided in a lower portion of the connection port side opening 48 to exhibit a sealing function.

The second shutter member 50 is provided rotatable about the second hinge portion 52 disposed on one side of the shutter body 50a. The second shutter member 50 rotates to switch between the closed state in which the seal ring 50b is in contact with the second seat portion 58 provided in the lower portion of the connection port side opening 48 to close the connection port side opening 48 and the open state in which the seal ring 50b is separated from the second seat portion 58 to open the connection port side opening 48.

Figure 5A:
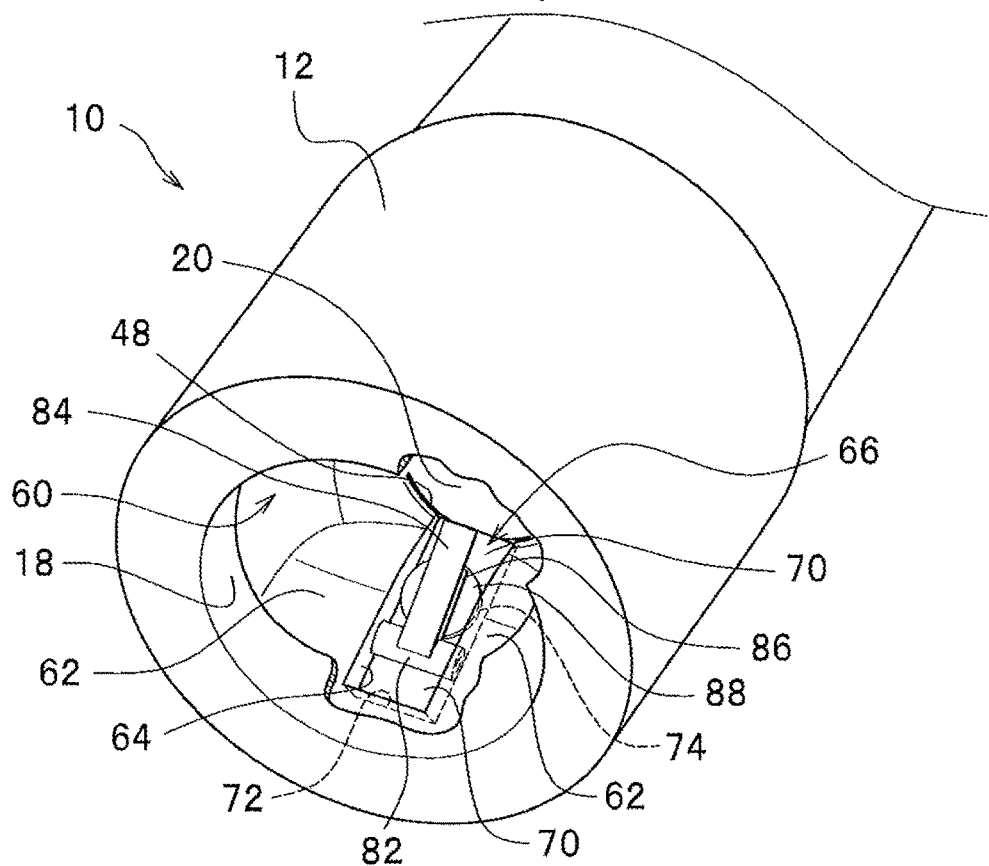
FIG. 5A is a partially cutaway perspective view showing a wall portion and an inclined surface formed on an inner wall of an inner diameter member in the present embodiment.

FIG. 5A is a partially cutaway perspective view showing a wall portion and an inclined surface formed on an inner wall of an inner diameter member in the present embodiment. Between the filler port 18 and the connection port 20 of the tubular portion 12, there is provided a first inner diameter member (inner diameter member) 60 attached to an inner wall of the tubular portion 12. A pair of guide portions 62, 62 for guiding the tip of the nozzle N inserted through the fuel filler port 18 toward the connection port 20 is provided on the inner wall of the first inner diameter member 60 (see FIG. 5A). Each of the guide portions 62 is formed in a substantially arc shape in a side view (see FIG. 1).

Between the pair of guide portions 62, 62, there is formed a concave portion 64 extending substantially linearly from a portion close to the filler port 18 toward the connection port 20 and having a substantially elongated strip shape as seen from the filler port 18. A bottom surface of the concave portion 64 functions as a placement surface on which a drain hole on-off valve 66 is disposed. When the fuel supply portion structure 10 is applied to the vehicle, the placement surface is located at the lowermost side of the vehicle on the inner wall of the first inner diameter member 60 (see a vertical direction of FIGS. 3A, 3B).

In the present embodiment, the placement surface on which the drain hole on-off valve 66 is disposed is formed on the inner wall of the first inner diameter member 60 which is formed separately from the tubular portion 12, however, it is not limited thereto, but for example, the tubular portion 12 and the first inner diameter member 60 may be integrally formed, and the placement surface may be provided on an inner wall thereof. When the tubular portion 12 and the first inner diameter member 60 are integrally formed, the integral tubular portion has both functions of the "tubular portion" and the "inner diameter member attached to the inner wall of the tubular portion".

Figure 5B:
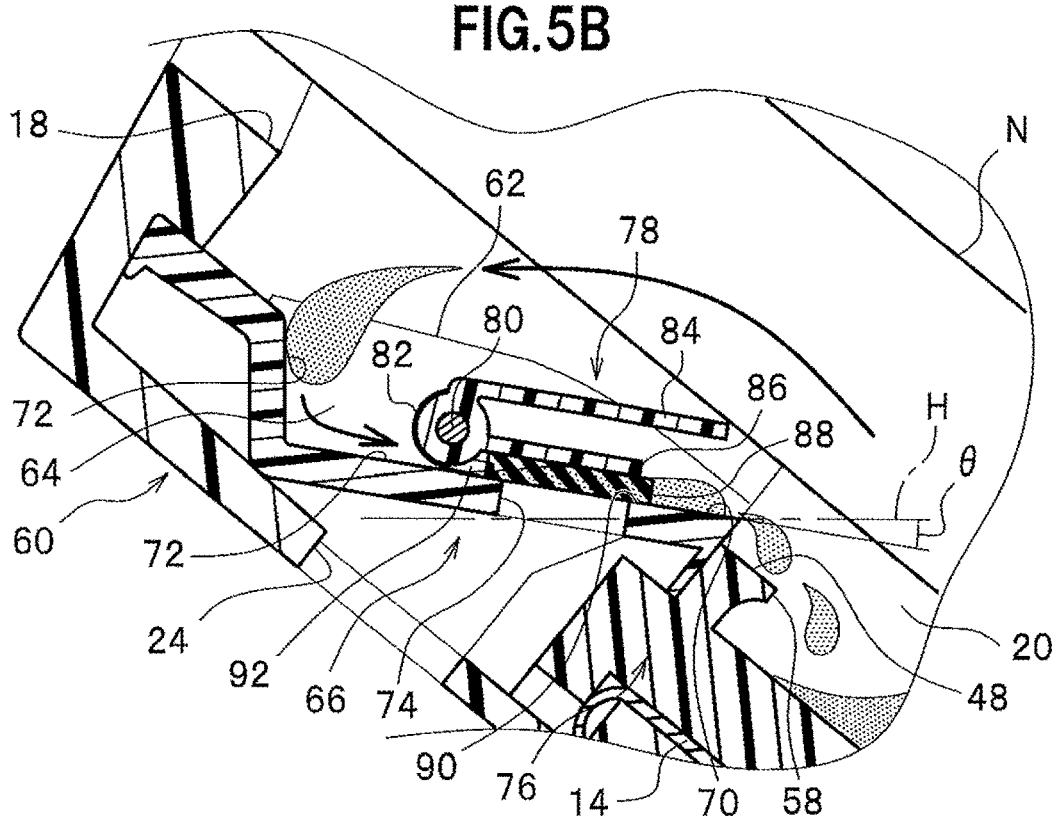
FIG. 5B is an enlarged cross-sectional explanatory view showing a state in which fuel flowing back at the time of the automatic stop operation during refueling hits the wall portion, and then flows out toward a filler pipe along the inclined surface.

The placement surface is formed by an inclined surface 70 falling from the filler port 18 side toward the connection port 20 with respect to a vehicle horizontal plane H (see FIG. 5B). On the filler port 18 side of the inclined surface 70, there is provided a wall portion 72 rising toward the filler port 18 (an upper side in a vertical direction of the vehicle). On the inclined surface 70, there is formed a communication hole 74 located below the drain hole on-off valve 66 and communicating with the drain hole 24. In FIG. 5B, an inclination angle θ of the inclined surface 70 falling from the filler port 18 side toward the filler pipe 14 with respect to the vehicle horizontal plane H is preferably about 3° to 5° (θ=3° to 5°). Note that the vehicle horizontal plane H means a plane perpendicular to the vertical direction of the vehicle.

Between the connection port 20 and the drain hole 24 of the tubular portion 12, there is provided a second inner diameter member 76 attached to the inner wall of the tubular portion 12. The second inner diameter member 76 is formed with the connection port side opening 48 and the second seat portion 58. The filler pipe 14 is sandwiched between the tubular portion 12 on the outer diameter side and the second inner diameter member 76 on the inner diameter side. The second inner diameter member 76 has both functions of connecting the filler pipe 14 to the connection port 20 and a support function of supporting a rotating shaft of the second flap mechanism 46.

Between the filler port 18 and the drain hole 24, there is disposed the drain hole on-off valve 66 for opening and closing the drain hole 24. The drain hole on-off valve 66 has an opening and closing mechanism 78 for closing the communication hole 74 (drain hole 24) by being pressed by the nozzle N inserted through the filler port 18.

The opening and closing mechanism 78 includes a rotating portion 82 which is rotatably supported between side walls of the pair of guide portions 62, 62 (see FIG. 5A) facing each other via a rotating shaft 80 and is provided rotatably by a predetermined angle about the rotating shaft 80, a pressing portion 84 which extends in a direction substantially perpendicular to the rotating portion 82 (direction in which the concave portion 64 extends) and is pressed by the nozzle N inserted through the filler port 18, a valve body 86 which extends substantially in parallel with the pressing portion 84 from the rotating portion 82 and rotates in conjunction with the pressing portion 84 about the rotating shaft 80, and a disc-shaped sealing portion 88 made of rubber or resin which is adhered or fixed to a wall surface of the valve body 86 facing the communication hole 74.

The opening and closing mechanism 78 further includes a seat portion 90 which is provided in the first inner diameter member 60 and on which the disc-shaped sealing portion 88 of the valve body 86 is seated, and a return spring member 92 which urges the disc-shaped sealing portion 88 of the valve body 86 in a direction away from the seat portion 90 when a pressing force of the nozzle N is removed. The return spring member 92 urges the drain hole on-off valve 66 in a direction to be opened (direction in which the communication hole 74 (drain hole 24) is opened). A tip of the pressing portion 84 projects from the concave portion 64 toward the inner space 22 so as to easily engage with the nozzle N in an initial state thereof (see FIG. 1). An axial length of the pressing portion 84 is longer than that of the valve body 86.

The fuel supply portion structure 10 according to the present embodiment is basically configured as described above, and its operation and operational effects will be described next. FIGS. 2A and 2B are partially omitted enlarged cross-sectional views for describing an operation of the opening and closing mechanism shown in FIG. 1. Hereinafter, the operation of the opening and closing mechanism 78 will be described in detail.

As shown in FIG. 1, when the first shutter member 28 of the first flap mechanism 26 is in the closed state, a spring force of the first spring member 32 of the first flap mechanism 26 is applied in a direction in which the first shutter member 28 is seated on the first seat portion 44. At the same time, a spring force of the return spring member 92 is applied in a direction in which the disc-shaped sealing portion 88 of the valve body portion 86 is separated from the seat portion 90 (direction in which the drain hole on-off valve 66 is opened). In a normal state except during refueling, the inner space 22 and the outside are held in communication with each other through the communication hole 74 and the drain hole 24.

As described above, in the normal state except during refueling in the present embodiment, the drain hole on-off valve 66 is opened and the drain hole 24 can be opened. As a result, in the normal state in the present embodiment, water, dust and the like entering the inner space 22 through the communication hole 74 and the drain hole 24 communicating with the outside can be discharged to the outside.

When the nozzle N of the refueling gun (not shown) is inserted through the filler port 18, the first shutter member 28 is pressed downward by the tip of the nozzle N. As shown in FIG. 2A, the first shutter member 28 rotates counterclockwise by a predetermined angle around the first hinge portion 30 against the spring force of the first spring member 32. Since the first shutter member 28 is separated from the first seat portion 44, the first flap mechanism 26 is in an open state in which the filler port 18 is opened.

As shown in FIG. 2B, when the refueling is completed and the nozzle N is withdrawn from the filler port 18, the first shutter member 28 is seated on the first seat portion 44 by the spring force of the first spring member 32 to return to an original position thereof. At the same time, the valve body 86 and the pressing portion 84 of the opening and closing mechanism 78 rotate in a counterclockwise direction about the rotation shaft 80 by the spring force of the return spring 92, and since the disc-shaped sealing portion 88 of the valve body 86 separates from the seat portion 90, the communication hole 74 (drain hole 24) is opened.

Next, a case will be described where the fuel is supplied by a fuel supply device having a suction mechanism for sucking volatile fuel into a tank of a gas station at the same time as refueling in order to prevent release of the volatile fuel to the atmosphere during refueling.

Figure 3A:
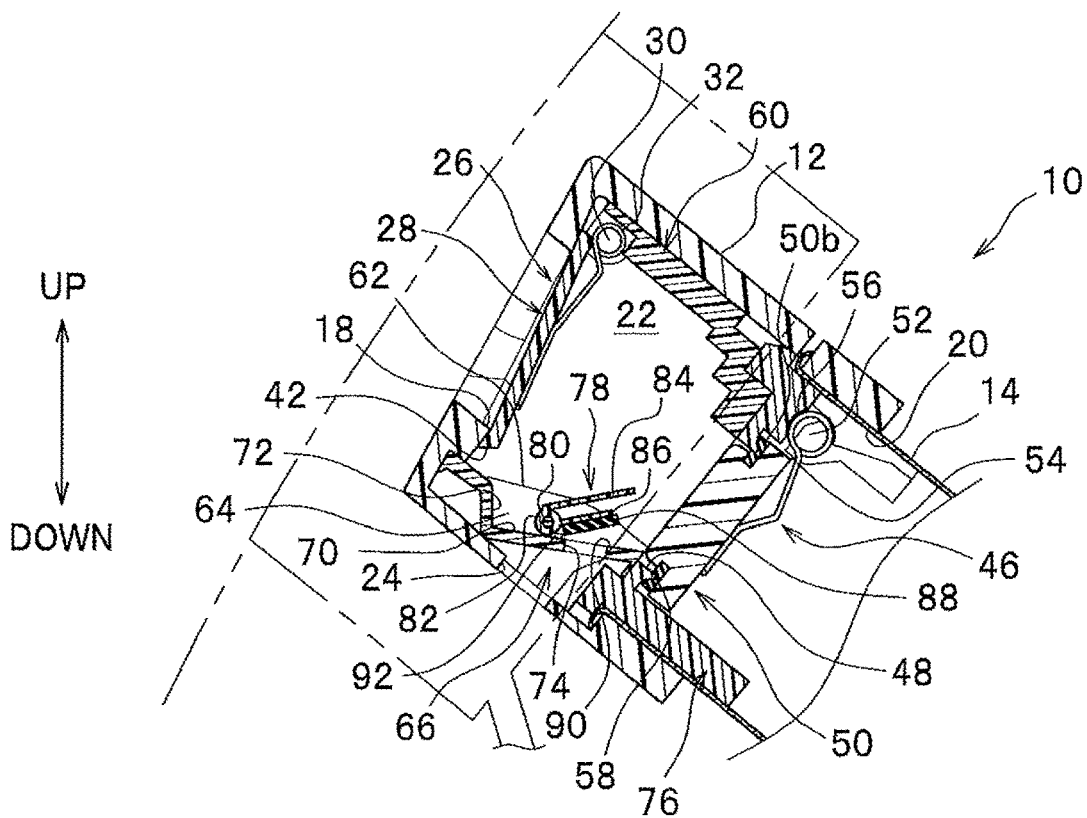
FIG. 3A is a cross-sectional view showing a state before refueling in the present embodiment.
Figure 3B:
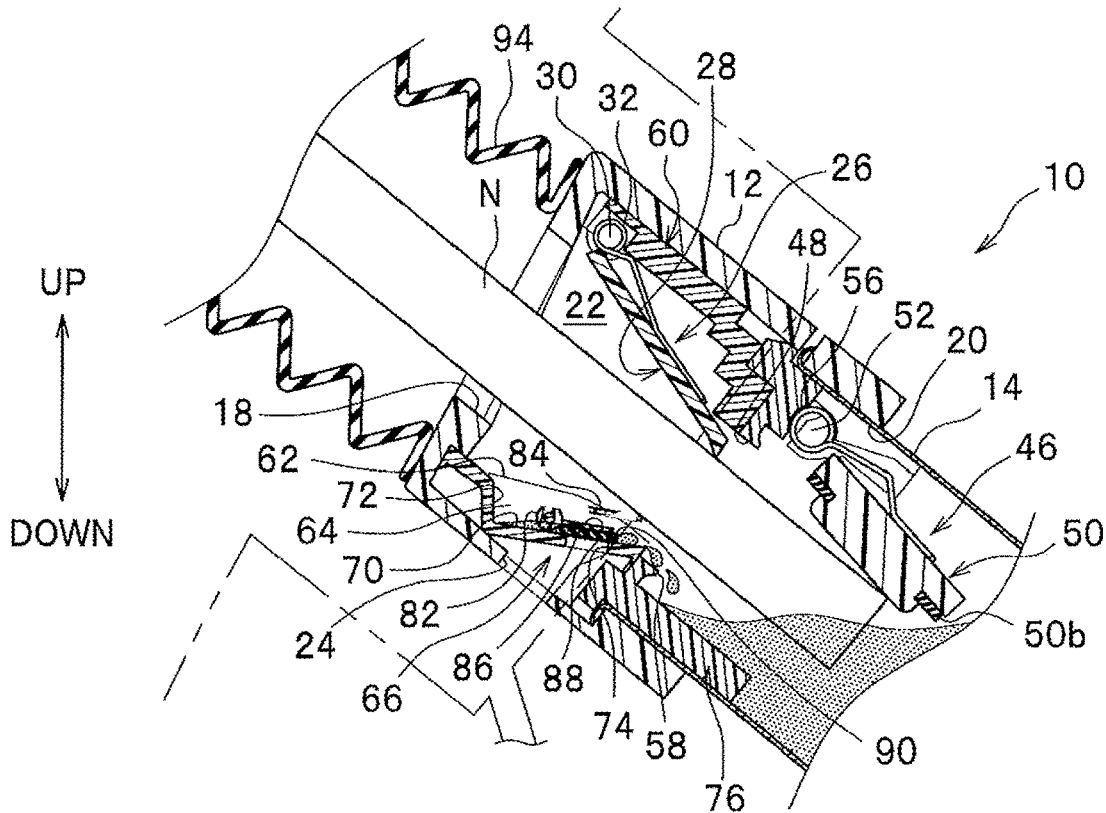
FIG. 3B is a cross-sectional view showing a state at the time of an automatic stop operation during refueling in the present embodiment.

In the present embodiment, the communication hole 74 and the drain hole 24 are opened in the normal state except during refueling (see FIG. 3B), however, the opening and closing mechanism 78 of the drain hole on-off valve 66 is operated by the pressing force of the nozzle N during refueling, so that the disc-shaped sealing portion 88 of the valve body 86 is seated on the seat portion 90 and the communication hole 74 (drain hole 24) is closed (see FIG. 3B).

Thus, in the present embodiment, when the fuel is supplied by the fuel supply device having the suction mechanism for sucking the volatile fuel at the same time as refueling, the communication hole 74 (drain hole 24) is held in a closed state by the opening and closing mechanism 78, it is possible to suitably avoid a decrease in suction efficiency of the volatile fuel during refueling. As a result, in the present embodiment, it is possible to secure negative pressure sealability during refueling and to increase a suction amount of the volatile fuel during refueling.

Figure 4A:
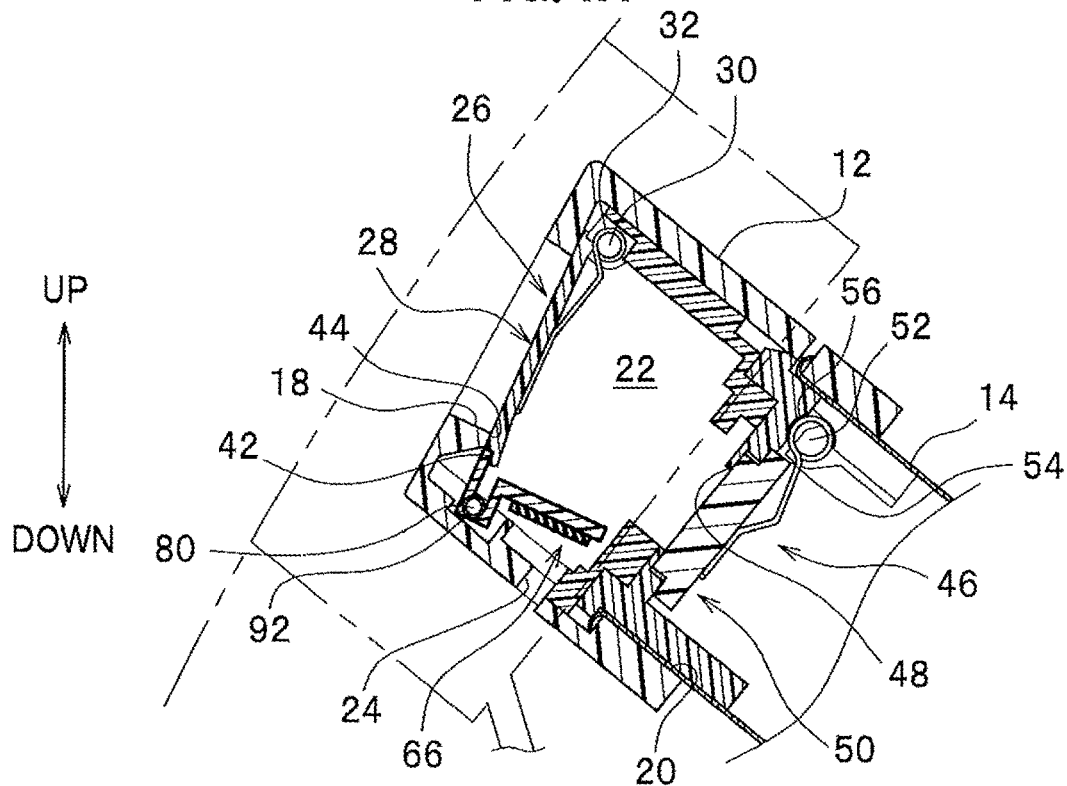
FIG. 4A is a cross-sectional view showing a state before refueling in a comparative example proposed by the applicant.
Figure 4B:
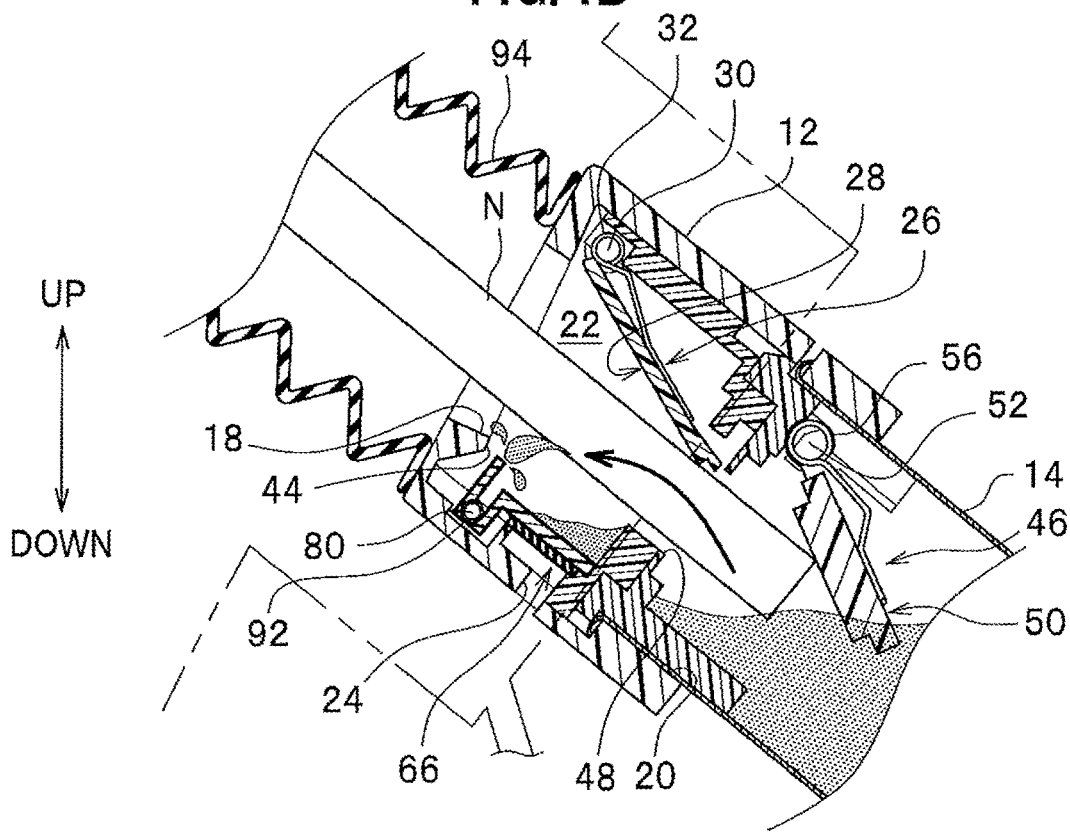
FIG. 4B is a cross-sectional view showing a state at the time of an automatic stop operation during refueling in the comparative example.

FIG. 3A is a cross-sectional view showing a state before refueling in the present embodiment, FIG. 3B is a cross-sectional view showing a state at the time of an automatic stop operation during refueling in the present embodiment, FIG. 4A is a cross-sectional view showing a state before refueling in a comparative example proposed by the applicant, and FIG. 4B is a cross-sectional view showing a state at the time of an automatic stop operation during refueling in the comparative example. Note that an automatic stop function during refueling operates since the fuel is detected by an automatic stop sensor (not shown) attached to the tip of the nozzle N.

In FIGS. 3B and 4B, a reference numeral 94 indicates a rubber bellows covering the nozzle N. As shown in FIGS. 3A, 3B, 4A, 4B, "UP and DOWN" indicates the vertical direction when the fuel supply portion structure is applied to the vehicle.

The comparative example proposed by the applicant has the same structure as the present embodiment except for those corresponding to the drain hole on-off valve 66 (including the opening and closing mechanism 78), the inclined surface 70 and the wall portion 72 arranged in the present embodiment. FIG. 5B is an enlarged cross-sectional explanatory view showing a state in which the fuel flowing back at the time of the automatic stop operation during refueling hits the wall portion, and then flows out toward the filler pipe along the inclined surface.

In the comparative example, as shown in FIG. 4B, when the fuel flows back at the time of the automatic stop operation during refueling, there is no obstacle to block the fuel flowing back, and thus there is a possibility that a part of the fuel flowing back (see a halftone dot portion) leaks from the filler port 18 toward the outside.

In contrast, as shown in FIG. 5B in the present embodiment, the fuel (see the halftone dot portion) flowing back at the time of the automatic stop operation during refueling rises along the concave portion 64 between the pair of guide portions 62, 62, and hits the wall portion 72 of the first inner diameter member 60 rising toward the filler port 18. In other words, the fuel flowing back at the time of the automatic stop operation during refueling is blocked by the wall portion 72 which is a barrier.

The fuel hitting the wall portion 72 falls on the inclined surface 70 continuous with the wall portion 72 and falling from the filler port 18 side toward the connection port 20, and then flows out toward the filler pipe 14 (toward the fuel tank 16) along the inclined surface 70 (see FIG. 4B). As a result, in the present embodiment, it is possible to prevent the fuel from leaking to the outside by the wall portion 72 and the inclined surface 70 even when the fuel flows back at the time of the automatic stop operation during refueling.

Further, in the present embodiment, since the drain hole on/off valve 66 including the opening and closing mechanism 78 is disposed in the concave portion 64 between the pair of guide portions 62, 62, there is no obstacle when the nozzle N is inserted through the fuel supply hole 18, and the drain hole 24 can be stably opened and closed.

REFERENCE SIGNS LIST

10: fuel supply portion structure
12: tubular portion (tube portion)
14: filler pipe (fuel supply pipe)
16: fuel tank
18: filler port (opening)
20: connection port
24: drain hole
26: first flap mechanism (flap mechanism)
46: second flap mechanism (another flap mechanism)
48: connection port side opening
60: first inner diameter member (inner diameter member)
62: guide portion
64: concave portion
66: drain hole on-off valve
70: inclined surface (placement surface)
72: wall portion
N: nozzle
H: vehicle horizontal plane

The invention claimed is:

1. A fuel supply portion structure of a fuel supply pipe, comprising:
   a tubular portion having an opening into which a nozzle of a refueling gun is inserted and a connection port to which the fuel supply pipe for supplying fuel to a fuel tank is connected;
   a flap mechanism which is provided on an opening side of the tubular portion and is pressed by the nozzle to open the opening when the nozzle is inserted through the opening;
   a drain hole formed in the tubular portion and communicating inside and outside of the tubular portion;
   an inner diameter member attached to an inner wall of the tubular portion; and
   a drain hole on-off valve for opening and closing the drain hole, wherein
   the drain hole on-off valve is disposed on a placement surface located at a lowermost side of the fuel supply portion structure on an inner wall of the inner diameter member,
   the placement surface is made of an inclined surface falling from the opening side toward the connection port with respect to a horizontal plane of the vehicle, and
   a wall portion rising toward the opening is provided on the opening side of the inclined surface.

2. The fuel supply portion structure of the fuel supply pipe according to claim 1, wherein
   a pair of guide portions for guiding a tip of the nozzle toward the connection port is provided on the inner wall of the inner diameter member, and
   the placement surface is a bottom surface of a concave portion formed between the pair of guide portions.

3. The fuel supply portion structure of the fuel supply pipe according to claim 1, further comprising another flap mechanism which is provided on a connection port side of the tubular portion and is pressed by the nozzle to open an opening on the connection port side when the nozzle is inserted through the opening of the tubular portion.

4. The fuel supply portion structure of the fuel supply pipe according to claim 2, further comprising another flap mechanism which is provided on a connection port side of the tubular portion and is pressed by the nozzle to open an opening on the connection port side when the nozzle is inserted through the opening of the tubular portion.

* * * * *